United States Patent
Reimers et al.

(10) Patent No.: US 12,316,172 B2
(45) Date of Patent: May 27, 2025

(54) ROTOR FOR AN ELECTRIC RING MACHINE, CORRESPONDING RING MACHINE AND METHOD FOR PRODUCING A ROTOR

(71) Applicant: RHEINISCH-WESTFALISCHE TECHNISCHE HOCHSCHULE (RWTH) AACHEN, Aachen (DE)

(72) Inventors: Jan-Dirk Reimers, Aachen (DE); Rik De Doncker, Aachen (DE); Tobias Berthold, Düren (DE); Tobias Lange, Aachen (DE); Claude Pascal Weiss, Aachen (DE)

(73) Assignee: RHEINISCH-WESTFALISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 134 days.

(21) Appl. No.: 17/295,185

(22) PCT Filed: Nov. 26, 2019

(86) PCT No.: PCT/EP2019/082628
§ 371 (c)(1),
(2) Date: May 19, 2021

(87) PCT Pub. No.: WO2020/109329
PCT Pub. Date: Jun. 4, 2020

(65) Prior Publication Data
US 2021/0399615 A1    Dec. 23, 2021

(30) Foreign Application Priority Data
Nov. 26, 2018   (EP) ..................... 18020618

(51) Int. Cl.
H02K 15/022    (2025.01)
H02K 1/24     (2006.01)

(52) U.S. Cl.
CPC .......... *H02K 15/022* (2013.01); *H02K 1/246* (2013.01)

(58) Field of Classification Search
CPC ......... H02K 1/27; H02K 1/246; H02K 15/022
(Continued)

(56) References Cited

U.S. PATENT DOCUMENTS 5,757,100 A * 5/1998 Burgbacher ........... H02K 29/03
                                                     310/156.43
5,818,140 A   10/1998 Vagati
(Continued)

FOREIGN PATENT DOCUMENTS

CN    105553127    *  5/2016    ............... H02K 1/17
CN    105553139 A    5/2016
(Continued)

OTHER PUBLICATIONS

Tong Wei; "2 Rotor Design;" 2 Rotor Design, Boca Raton, London, New York; CRC Press; pp. 83-153; Jan. 31, 2014.
(Continued)

*Primary Examiner* — Terrance L Kenerly
(74) *Attorney, Agent, or Firm* — Renner, Otto, Boisselle & Sklar, LLP

(57) ABSTRACT

The invention relates to an arrangement in the form of an electric ring machine in the implementation of a reluctance machine which is operated as a synchronous reluctance machine, in which recesses are formed at the outer side of the rotor sheets in the radial extension opposite to the inner barriers. These result in webs which hold and enclose the barriers and can thus be manufactured in a defined manner at both sides, even if the finished assembled rotor design is later finally mechanically reworked at the outer side. In addition to the rotor, the invention also relates to a corresponding electric ring machine and a method for producing such a rotor.

7 Claims, 2 Drawing Sheets

(58) Field of Classification Search
USPC ............. 310/265, 266, 267, 156.56, 156.53, 310/216.001
See application file for complete search history.

(56) References Cited

U.S. PATENT DOCUMENTS

| | | |
|---|---|---|
| 11,075,553 B2 | 7/2021 | Tong et al. |
| 2011/0285238 A1 | 11/2011 | Kusase et al. |
| 2012/0074801 A1* | 3/2012 | Brown .................... H02K 1/32 310/59 |
| 2017/0163106 A1* | 6/2017 | Jassal ...................... H02K 5/00 |

FOREIGN PATENT DOCUMENTS

| | | |
|---|---|---|
| DE | 102011050504 A1 | 1/2012 |
| DE | 102016205246 A1 | 10/2017 |
| EP | 3261237 A1 | 12/2017 |
| JP | 2000184640 A | 6/2000 |

OTHER PUBLICATIONS

International Search Report and Written Opinion for corresponding International Patent Application No. PCT/EP2019/082628 mailed on Feb. 11, 2020.
Chinese Office Action for corresponding Application No. 201980088118.5, issued Jun. 12, 2024, with English translation.

* cited by examiner

ROTOR FOR AN ELECTRIC RING MACHINE, CORRESPONDING RING MACHINE AND METHOD FOR PRODUCING A ROTOR

This application is a national phase of International Application No. PCT/EP2019/082628 filed Nov. 26, 2019, which claims priority to European Application No. EP 18020618.7 filed on Nov. 26, 2018, both of which are hereby incorporated by reference herein.

The present invention relates to an arrangement of a rotor for an electric work machine, which is designed as a segmented ring machine and is intended for a 4-quadrant operation with an inverter.

In addition to the rotor, the invention also relates to a corresponding electric ring machine and a method for producing such a rotor.

The rotor comprises a plurality of individual sheets electrically insulated from each other, which are stacked to a sheet package. A rotor for a reluctance motor is known from U.S. Pat. No. 5,818,140 A. The rotor described therein comprises a sheet package of laminated rotor sheets which have recesses, e.g. punch-outs or cut-outs, called barriers. This rotor is also commonly referred to as a Vagati rotor. By means of the barriers mostly curved, strip-shaped sheet sections are obtained, which serve as flux conducting sections. In this way the magnetic flux is guided in a manner necessary to provide the reluctance of the rotor. The reactance of the sheet package is relatively small in the direction of the q-axis, i.e. in the magnetic blocking direction, due to the non-magnetic regions. The strip-shaped flux-guiding sections extend transverse to the q-axis and connect poles of the rotor which are adjacent in the circumferential direction, i.e. the d-axes.

The recesses for forming the flux barriers lead on the one hand to a weakening of the mechanical stability of the sheet package, on the other hand, however, the intentionally thin webs nevertheless lead to an undesired flux leakage. This reduces torque formation. Thus, both the thickness and the constancy of the thickness of the webs is a measure for the performance of the rotor.

However, the basically strip-shaped flux-guiding sections lead to a predictable and basically high torque yield. The manufacturing tolerances now in particular affect the geometrical dimensions which are likewise characterized by a small dimension, wherein the web thickness is such a dimension. The web thickness can and should be in the order of magnitude of the electrical sheet thickness, which is between 0.8 and 0.2 mm.

The web thickness can therefore be between 0.2 and 1.2 mm.

The roundness dimensions of a rotor dimensioned 1.2 m in diameter alone can be a good fraction thereof in a segmental construction. The web thickness at the ends of the barrier is additively superimposed by these manufacturing and construction tolerances when the rotor is designed according to the state of the art. Even if the assembled rotor is packaged with oversize and is subsequently machined to its final dimension, eccentricities add circumferentially to the web thickness distribution. Generally thicker web widths make the percentage and circumferential thickness error or even a destruction of the webs during machining less likely and smaller, but reduce the possible torque and generate a circumferential torque and flux error.

It is the object of the present invention to provide a reluctance rotor of the type described above which enables both a high torque and a simplified production, so that it is suitable in particular as a low-cost industrial large drive.

The object is achieved by the subject matter of the independent patent claims. Advantageous further embodiments of the invention result from the features of the dependent claims. Here, the rotor according to the invention is likewise designed as a reluctance rotor according to the principle of Vagati, i.e. it comprises sheet layers made of a ferromagnetic material, wherein each rotor sheet layer is formed from one or more rotor sheets and comprises at least one flux blockade or barrier formed by a recess in the rotor sheet layer.

The present example comprises three barriers, however, the embodiments also apply to rotor sheet layers comprising a plurality of flux barriers.

In the frame of the constructional design the application requirements for the barriers and webs face the need for manufacturing capability, for a suitable manufacturing sequence in the case of a modular design, or for constructional platform concepts that in the first place enable the economical and thus industrial production of drive components by component manufacturers. In this field of requirements, problems still exist within the technological compromise of a constructional and production-optimized design.

The problem of the electric machines described at the beginning and also of the design of the manufacturing according to the state of the art concerns the circumferential web thickness of the barriers after assembly and also after machining the manufacturing oversize of the rotor sheets with larger air gap dimensions.

The problem within the feasibility of larger diameters stands and falls with the possibility to design the rotor despite assembly and manufacturing tolerances circumferentially evenly with barriers and to maintain the air gap constancy, in particular with an air gap diameter which is increased compared to the usual dimension, as would be present with designs as a disc machine with high torque.

These technical problems are not solved in any of the prior applications. An implementation is not known.

It is the purpose to propose a constructional design for the arrangement, which makes it possible to manufacture the barrier structure, as it is implemented according to the invention, uniformly and simplified as is illustrated in more detail in the following.

In order to achieve this object, the present invention provides an arrangement of the type mentioned above, which is characterized in that recesses are formed at the outer side of the rotor sheets in the radial extension opposite to the inner barriers. These result in webs which are produced in a defined manner on both sides and do not have to be further machined despite further production steps such as, for example, machining an oversize to the final air gap diameter.

It is advantageously provided that the recesses each produce a web of defined web thickness, wherein the rotor comprises an oversize machined to its final dimension, in which the effect of the machining is limited to an outer thickness of the barrier extension at the outer side of the rotor away from the areas of the barrier webs.

In other words, the recesses, which extend inwardly to such an extent that they (co-) form the barrier webs of a defined web thickness, now allow the rotor to be brought to its circumferential final dimension after assembly by machining (e.g., chip removing machining such as turning) without jointly machining the webs and thereby changing the web thickness. The recesses thus relocate the webs radially inwards and thus decouple the barrier webs and their web thickness from a reworking at the outer side of the rotor.

The invention further relates to a ring machine in the form of a reluctance machine, which is operated as a synchronous reluctance machine, comprising a stator and a rotor. It is provided that the rotor is formed as the aforementioned rotor.

The invention further relates to a method for producing a rotor for an electric ring machine in the form of a reluctance machine which is operated as a synchronous reluctance machine, wherein the rotor comprises rotor sheets which comprise barriers and wherein recesses are formed at the outer side of the rotor sheets in the radial extension opposite to the barriers, which respectively produce a barrier web of defined web thickness. A machining of an oversize of the rotor is intended which acts only on an outer thickness of the barrier extension at the outer side of the rotor away from the areas of the barrier webs.

These and other features and advantages of the present invention will become clear from the following description of various arrangements according to the invention with reference to the accompanying drawing. In the drawing.

In the following, the use of the term electric machine or drive means both a motor-driven and a generator-driven electric machine. The term rotor 10 refers to the rotating part of the electric machine, which in the torque generating part can consist of electrical sheet or of ring sections or segments.

Figure 1:
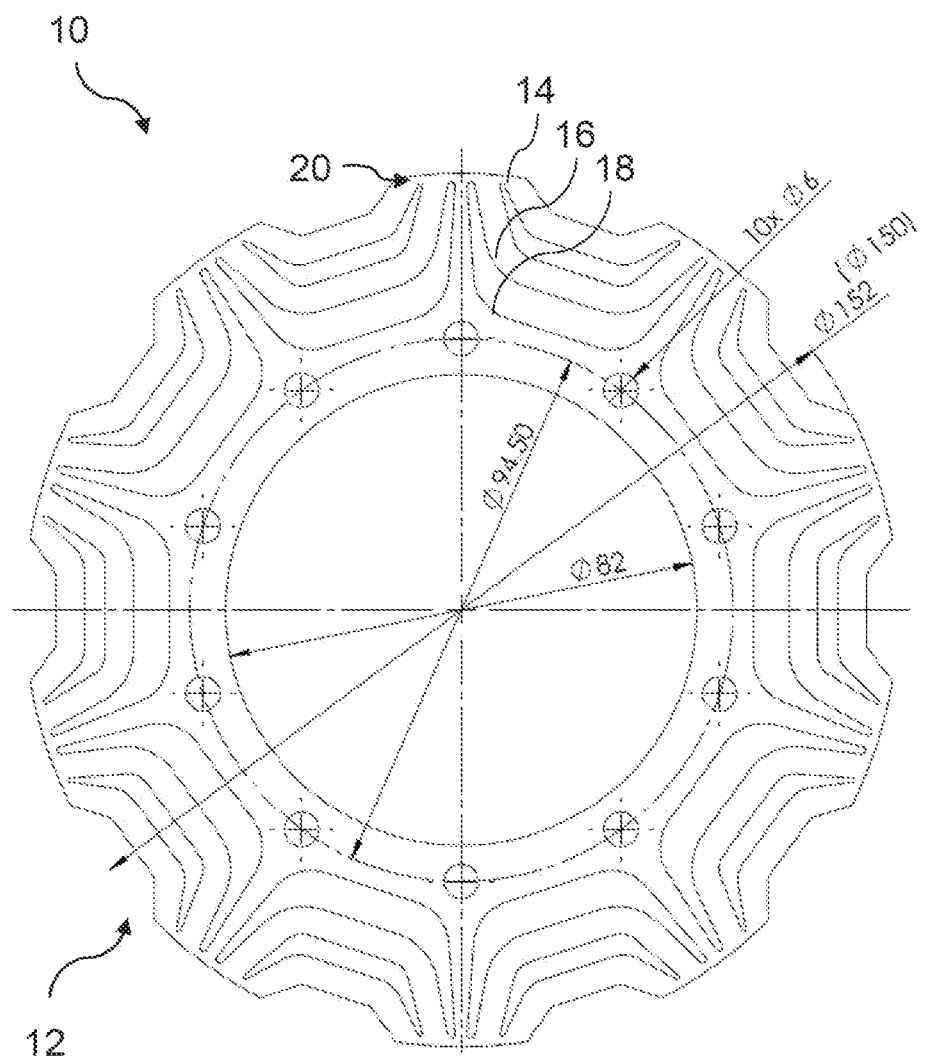
FIG. 1 is a schematic representation of an embodiment of a rotor sheet comprising flux barriers according to the prior art with oversize and without outer recesses for the barrier webs.

FIG. 1 shows a now commonplace embodiment of a rotor or rotor section of a rotor 10 or rotor sheet 12 for a synchronous reluctance machine according to the state of the art. Depending on the design, the rotor section may have an oversize in the air gap diameter or may directly have the dimension of the air gap diameter. Here, the tolerance chains of the assemblies, which result or can be achieved on the basis of the manufacturing technical design, under certain circumstances specify an oversize, which should later be machined to the desired air gap diameter after assembly. The rotor sheet 12 comprises barriers 14, 16, 18 with webs, i.e. barrier webs 20.

All manufacturing and assembly tolerances must be taken into account in the oversize so that the air gap diameter can be achieved later without removing material that is not desired, and without cutting into the open opposite to the eccentricity of the maximum tolerance position.

Figure 2:
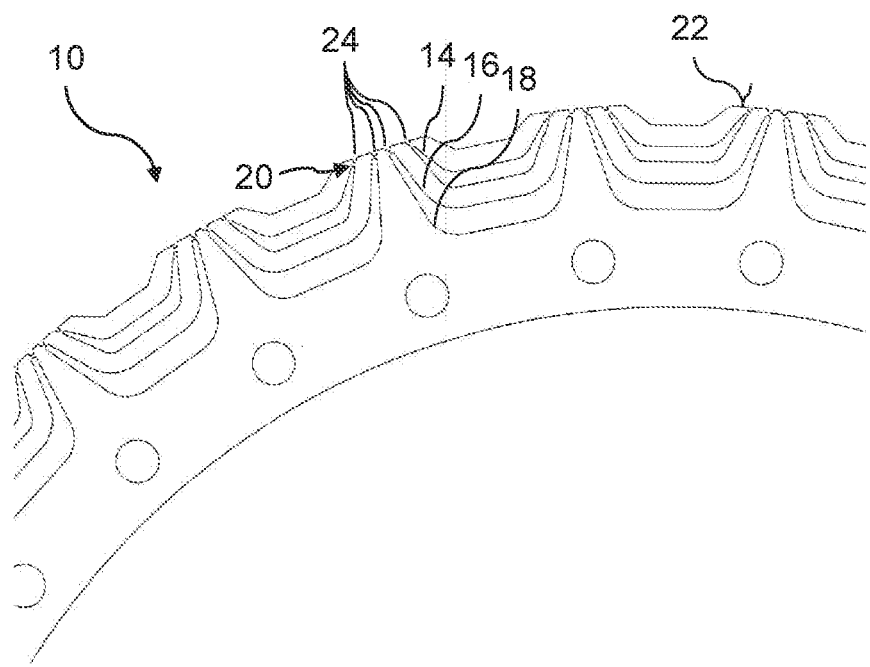
FIG. 2 is a schematic representation of an embodiment of a rotor sheet comprising flux barriers according to the procedure of the invention with or without oversize and in particular comprising outer recesses for the barrier webs.

A rotor section of a rotor 10 for a synchronous reluctance machine is shown in FIG. 2 in a manner according to the invention.

At the outer side, i.e. at the outer side 22 (or the outer circumference), of the rotor 10 or the respective rotor sheet 12 recesses 24 are arranged there, as shown, which terminate the webs 20 of the barriers 14, 14, 18 at the outer side. This results in that the web thickness d of the barrier webs 20 (clearly visible in FIG. 3) can be preset over the circumference with or without the use of an oversize. In the case of rotors 10 with an oversize, tolerances that are always present do not result in that the tolerance is impressed in the web thickness d of the barriers 14, 16, 18 when machining the oversize. It only affects the outer thickness 26 of the barrier extension and not the sensitive area of the thin webs 20, which must saturate during operation.

Therefore, an eccentricity of the rotor sheet orientation, as may become possible with larger air gap diameters of the order of the web thickness d, does not result in a circumferential web thickness change that would exhibit in the local flux and hence also in the current.

Figure 3:
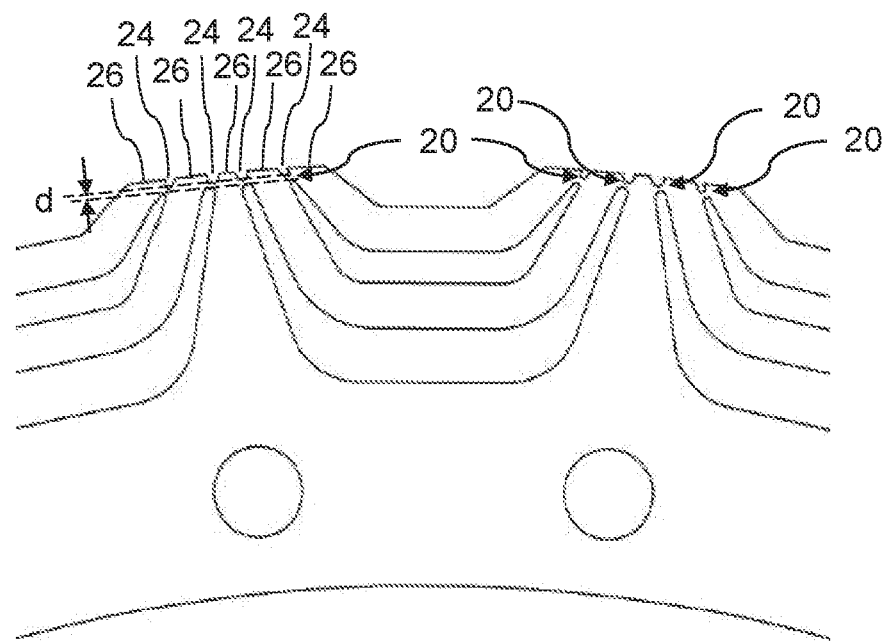
FIG. 3 is an enlarged schematic representation of the outer recesses for the barrier webs.

Details of the outer recesses 24 are shown in FIG. 3. A barrier structure with three barriers 14, 16, 18 is shown, in which the outer barrier comprises a further central recess in the outer rotor contour. The outer and the central barrier 14, 16 are provided at their webs 16 at both sides with the recesses 24 according to the invention at the outer air gap side of the later air gap diameter of the machine. Thus, two recesses 20 can be found per outer barrier 14 towards the central barrier 16 and two further outer recesses 20 can be found between the central barrier 16 and the inner, third barrier 18. The recesses 24 are opposite to the inner cut-outs 28 of the barriers 14, 16, 18.

Advantageously, a defined web thickness d results despite a circumferential eccentricity of the center of the barrier structure due to manufacturing and assembly tolerances.

In particular, a design by use of rotor segment elements becomes possible in the first place, which would otherwise lead to poor operating conditions of the electric machine due to the assembly tolerances. This allows to build machines with larger air gap diameters at low cost.

The recesses 24 and the barriers 14, 16, 18, or the rotor sheets 12 can be manufactured by means of cutting processes or separation processes. Laser cutting, punching or eroding are explicitly appropriate.

When the recesses are used according to the invention and the outer surfaces are subsequently machined, an edge effect of the sheet metal production which is harmful in the sense of flux guidance leads to a permanent influence on the web edges in the recesses and thus to an influence of the edge effects on the thin webs at both sides. The machined surfaces of the rotor at the air gap to the stator, however, are "exposed" and then remain magnetically damaged to a lesser extent and then largely correspond to the base material. Thus, in an additionally effective manner, the flux guidance in the webs is more impeded compared to the surrounding air gap area, which leads to an improved machine behavior.

In a manner according to the invention, the additional structuring of the rotor shell surface by the recesses promotes the air circulation in the air gap.

The pure rear-side cooling of now commonplace modern radial flux machines is less optimal than in the side area and in the air gap due to the heat transport from the air gap and winding area up to the rear side of the sheet packet. Within a radially enclosed air gap, air exchange is also considerably reduced. At the same time, however, the strongly swirled gap flow has an extremely high heat transfer, which is not utilized because the air cannot be transported out of the circumferential air gap. Here, according to the invention, due to the recesses at the webs a considerably faster air exchange takes place out of and into the air gap. In combination with the necessary inclination of the rotor packages in order to reduce the typical torque ripple of the barrier structure, this results in an improved axial air exchange in the air gap and its air guidance.

The rotor design according to the invention allows a segmented design to be implemented, which can be used for steps in size without the need to accordingly enlarge the rotor rings as a full profile when the air gap diameter increases. According to the invention the rotor profile can be segmented and the added tolerances are less significant.

The thus simplified enabled segmented design of the ring-shaped reluctance machine thus enables a modularization of the production means in accordance with the invention. The basically similar design of a pole geometry moreover enables a modular methodology and a modular construction in terms of scalability to several capacity ranges and torque classes, despite the same manufacturing technology and manufacturing sequence. Waste is reduced to a considerable extent and, even for very large rotor diameters, the segmented design enables a series production of the individual sheets according to today's standards, despite the individual construction of the motors or their modules.

Wheel drives, fan wheels, fan rollers, rotary tables, tube mills, tube furnaces, wind turbines and turbomachines can be manufactured within a wide capacity range on smaller production machines and reduced to a complete modular system in terms of production technology.

Although the invention has been illustrated and described in detail with respect to the preferred exemplary embodiment, the invention is not limited by the disclosed examples and within the scope of the invention other variations may be derived therefrom by those skilled in the art.

For example, the construction of the recesses can also be applied to external rotors in an inverted design.

REFERENCE SYMBOLS 10 rotor
12 rotor sheet
14 barrier
16 barrier
18 barrier
20 barrier web
22 outer side
24 recess
26 outer thickness
28 inner cut-out
d web thickness

The invention claimed is:

1. A synchronous reluctance motor comprising a rotor, wherein the rotor is free of a permanent magnet and comprises rotor sheets consisting of soft magnetic material, wherein the rotor sheets comprise inner barriers for flux guidance, wherein recesses are formed at an outer side of the rotor sheets in a radial extension opposite to the inner barriers, wherein the recesses each create a barrier web of a defined thickness between the recesses and the inner barriers, wherein the barrier web extends in a circumferential direction of the rotor sheets and separates the inner barriers from the recesses, wherein the web thickness is uniform over the circumference of the rotor, wherein the outer side of the rotor sheets defines a central recess opposite a single inner barrier, the central recess separated a circumferential distance from the barrier web, wherein a circumference of an outer rotor contour of each of the rotor sheets is defined by an outer thickness of a barrier extension wherein the barrier extension is formed at the outer side of the rotor sheets opposite to the inner barriers, and wherein the outer rotor contour is formed by machining the rotor on only an outer thickness of the barrier extension at the outer side of the rotor away from the areas of the barrier web to the final dimension by turning, such that the web thickness stays uniform over the circumference of the rotor.

2. The synchronous reluctance motor according to claim 1, wherein the barrier extension has an eccentricity with respect to an arrangement of the barrier webs.

3. The synchronous reluctance motor according to claim 1, wherein the electric machine is designed to incorporate the rotor as an external or internal rotor.

4. The synchronous reluctance motor according to claim 1, wherein the rotor sheets are designed as segmented rotor sheets and the rotor is assembled of corresponding segments.

5. The synchronous reluctance motor according to claim 1, in which the rotor is manipulated by means of magnetic material in a d-axis and a q-axis in addition to a flux guidance of the inner barriers.

6. A method for producing a rotor for an electric machine in the form of a reluctance machine which is operated as a synchronous reluctance machine, wherein the rotor comprises rotor sheets which comprise barriers, for flux guidance, and wherein recesses are formed at an outer side of the rotor sheets in a radial extension opposite to the barriers, which respectively allow a barrier web of a defined web thickness to be formed between the recesses and the barriers, wherein a circumference of an outer rotor contour of each of the rotor sheets is defined by an outer thickness of a barrier extension, wherein the barrier web extends in a circumferential direction of the rotor sheets and separates the barriers from the recesses, wherein the web thickness is preset over the circumference of the rotor, wherein the outer side of the rotor sheets defines a central recess opposite a single barrier, the central recess separated a circumferential distance from the barrier web, wherein the method comprises machining the outer side of the rotor on only an outer thickness of the barrier extension at the outer side of the rotor away from the areas of the barrier web, such that the web thickness stays uniform over the circumference of the rotor.

7. The method according to claim 6, wherein the recesses are formed by at least one laser cutting, punching, or eroding.

* * * * *